Dec. 30, 1958   LE ROY C. TILLOTSON   2,866,949
MICROWAVE CIRCULATORS, ISOLATORS AND BRANCHING FILTERS
Filed Oct. 29, 1953   5 Sheets-Sheet 1
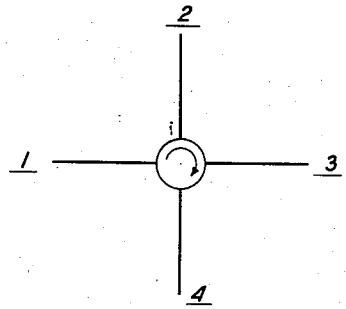
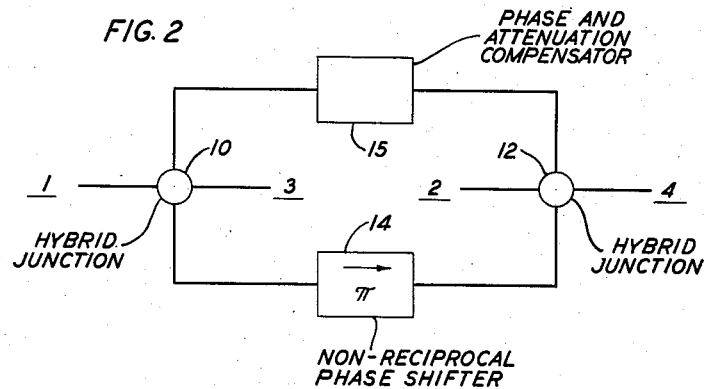
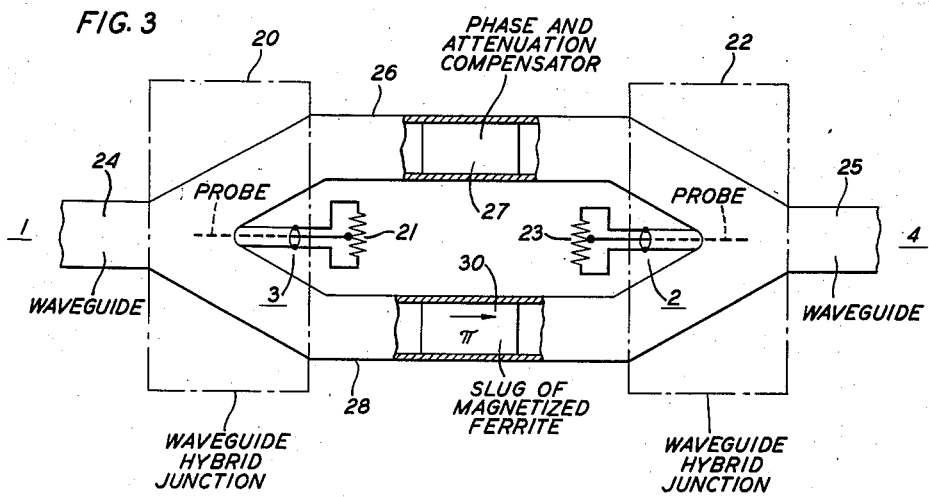
INVENTOR
L. C. TILLOTSON
BY H. O. Wright
ATTORNEY Dec. 30, 1958     LE ROY C. TILLOTSON     2,866,949
MICROWAVE CIRCULATORS, ISOLATORS AND BRANCHING FILTERS
Filed Oct. 29, 1953     5 Sheets-Sheet 2
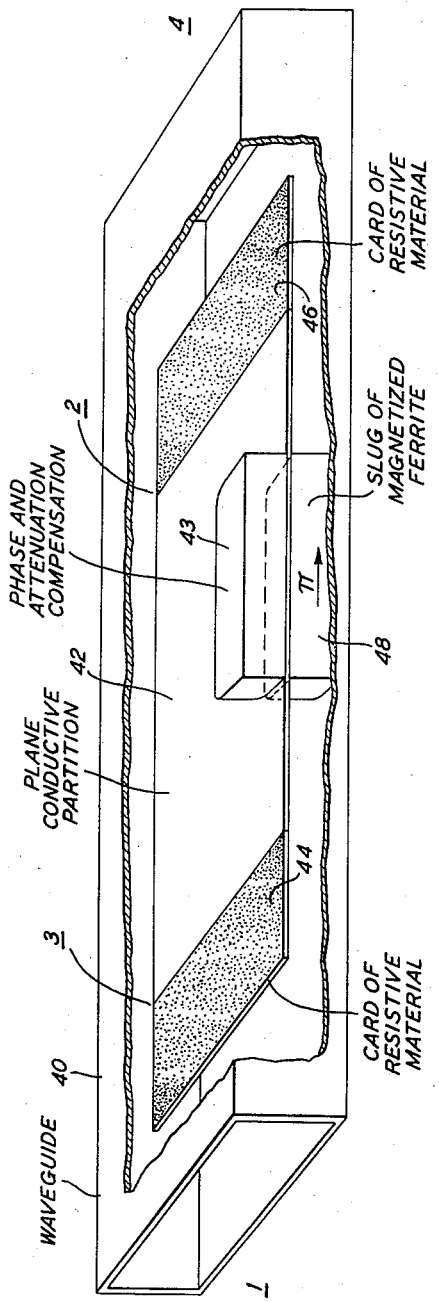
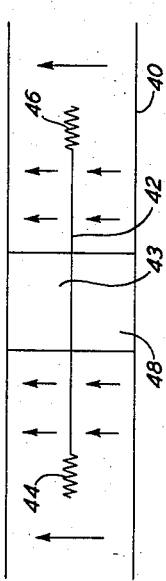
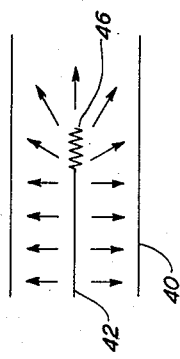
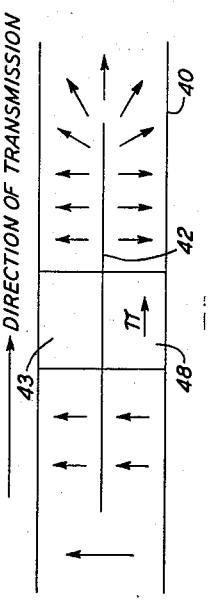
INVENTOR
L.C. TILLOTSON
BY
ATTORNEY Dec. 30, 1958   LE ROY C. TILLOTSON   2,866,949
MICROWAVE CIRCULATORS, ISOLATORS AND BRANCHING FILTERS
Filed Oct. 29, 1953   5 Sheets-Sheet 3
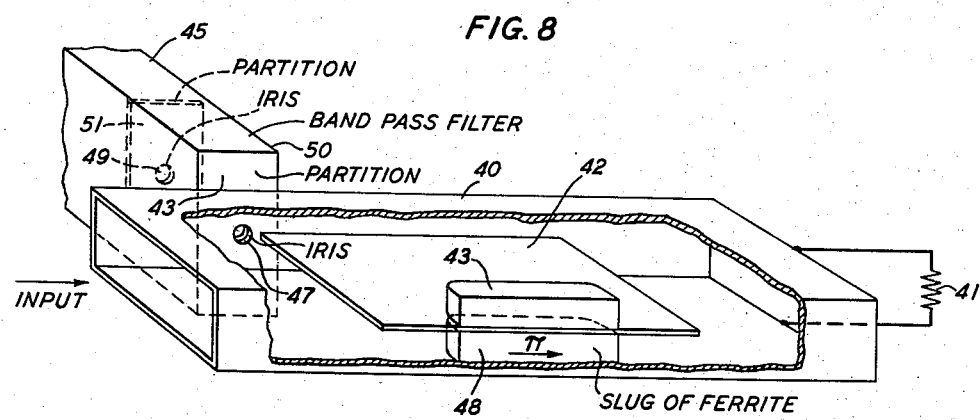
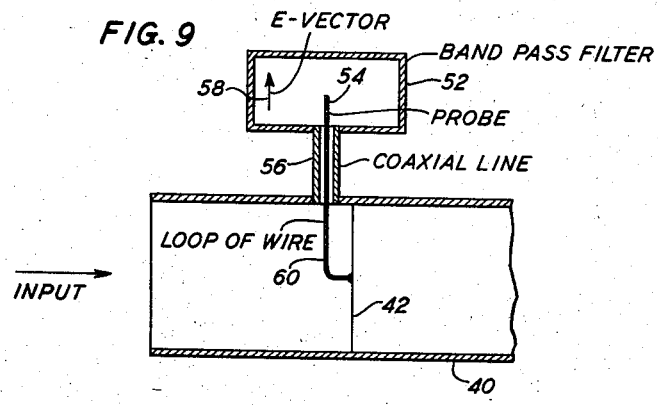
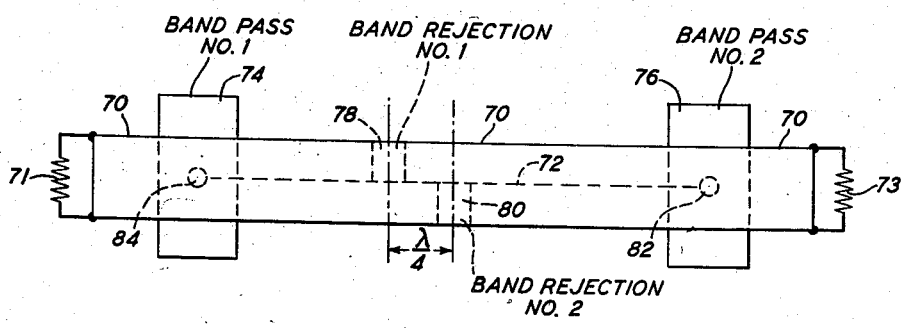
INVENTOR
L. C. TILLOTSON
BY
H. O. Wright
ATTORNEY Dec. 30, 1958 LE ROY C. TILLOTSON 2,866,949
MICROWAVE CIRCULATORS, ISOLATORS AND BRANCHING FILTERS
Filed Oct. 29, 1953 5 Sheets-Sheet 4

INVENTOR
L. C. TILLOTSON
BY
ATTORNEY

Dec. 30, 1958 LE ROY C. TILLOTSON 2,866,949
MICROWAVE CIRCULATORS, ISOLATORS AND BRANCHING FILTERS
Filed Oct. 29, 1953 5 Sheets-Sheet 5
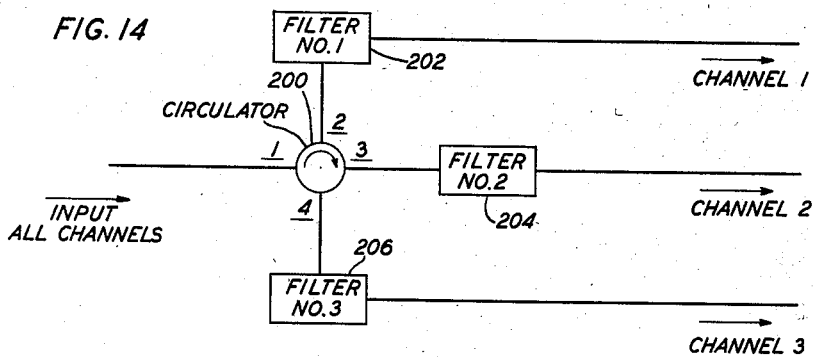
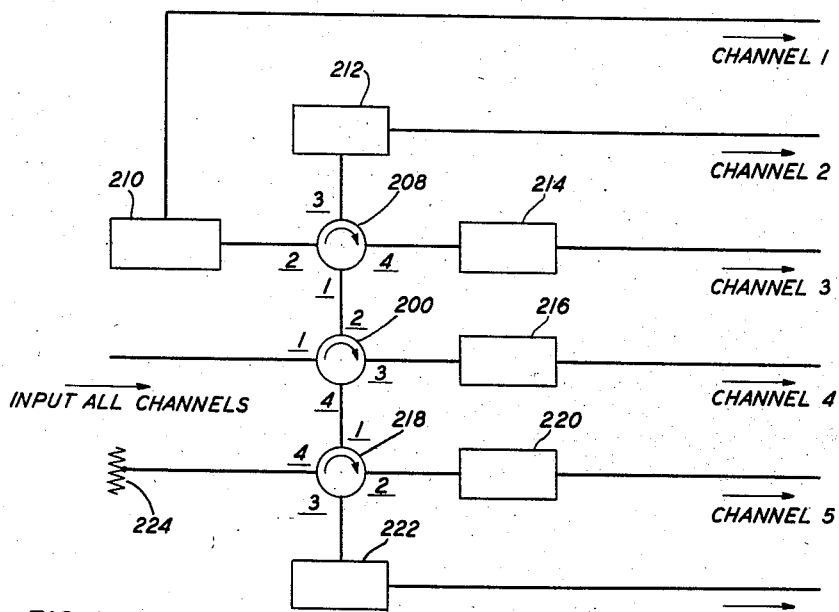
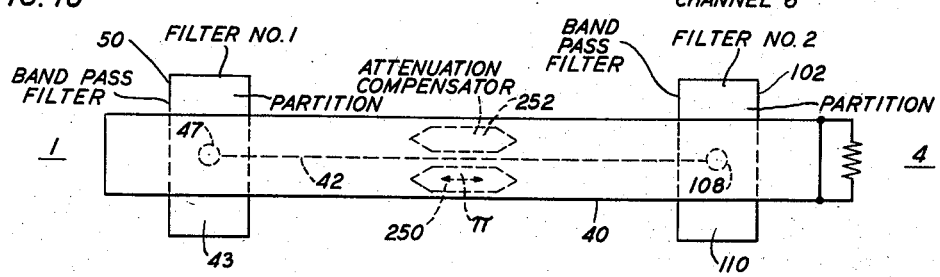
INVENTOR
L. C. TILLOTSON
BY H. O. Wright
ATTORNEY United States Patent Office 2,866,949
Patented Dec. 30, 1958

2,866,949

MICROWAVE CIRCULATORS, ISOLATORS, AND BRANCHING FILTERS

Le Roy C. Tillotson, Shrewsbury, N. J., assignor to Bell Telephone Laboratories, Incorporated, New York, N. Y., a corporation of New York Application October 29, 1953, Serial No. 389,137

2 Claims. (Cl. 333—11)

This invention relates to novel wave-guide structures for use with electromagnetic waves at very high frequencies, principally at frequencies within the range commonly designated as microwave frequencies. More particularly, this invention relates to novel, mechanically-simplified, wave-guide structures useful at the said high frequencies as circulators, isolators and channel branching filters.

A substantial portion of the structures of the invention are generically related to the circulator shown in Fig. 14 on page 26 of an article entitled "The Microwave Gyrator" by C. L. Hogan, published in the Bell System Technical Journal, vol. 31, No. 1, January 1952, pages 1 through 31. Hogan, however, employs a cylinder of ferrite in a round section of wave guide which arrangement is not conveniently adaptable for structures of the present invention, since, as will become apparent hereinunder, the latter structures comprise rectangular sections of wave guide.

The feasibility of obtaining a non-reciprocal 180 degree phase shift in a rectangular wave guide by use of an asymmetrically located member or slug of ferrite is demonstrated in the copending application of S. E. Miller Serial No. 362,193, filed June 17, 1953, assigned to applicant's assignee. Also of interest in connection with this specific item is the article entitled "Ferrites at Microwaves" by N. G. Sakiotis and H. N. Chait, published in the Journal of the Institute of Radio Engineers for January 1953 at pages 87 through 93, inclusive.

In addition to the non-reciprocal phase shift of π degrees (180 degrees), the presence of the ferrite slug also introduces a smaller reciprocal phase shift, usually designated $\theta$ degrees, and a small amount of attenuation. In structures of the invention in which a first path including the ferrite slug is balanced against a second path having no ferrite slug, it is, therefore, necessary, in order to obtain a precise balance, to introduce into the second path a member of dielectric material, such as polystyrene, proportioned to produce a compensating reciprocal phase shift of $\theta$ degrees, said polystyrene block including imbedded small particles (or a coating) of resistive material, such as carbon, proportioned to introduce a small compensating attenuation equal to the attenuation introduced in said first arm by the ferrite slug. Accordingly, a "phase and attenuation compensator" will be indicated in the "second arm" of such balanced structures of the invention which employ a ferrite slug in the first arm, the purpose of which, as described above, is to balance the reciprocal phase shift and attenuation of the ferrite slug employed in the "first arm."

By subdividing a straight section of rectangular wave guide of unequal cross-sectional dimensions by a plane conductive longitudinal sheet parallel to the broaded sides of the wave guide and providing appropriate coupling members at the ends of said sheet which couple equally to the two channels formed by inserting the sheet but are isolated by electrical balance from the adjacent ends, respectively, of the section of wave guide, applicant obtains, in a mechanically very simple structure, substantially the equivalent, electrically, of a pair of wave-guide hybrid junctions with two conjugately related arms of one junction connected through two wave-guide channels to the corresponding two conjugately related terminals of the other junction. By inserting a member or "slug" of ferrite asymmerically in one of said wave-guide channels and a phase and attenuation compensator, as above-described, in the other channel, applicant then obtains a "circulator" structure electrically equivalent for many purposes to that illustrated in Fig. 14 of the above-mentioned Hogan article. By combining filter structures with the divided wave-guide section in any of several ways, a number of which will be described in detail hereinbelow, applicant obtains simplified structures having the characteristics of channel branching filters substantially equivalent electrically to prior art wave-guide hybrid channel branching filters which require more complicated and expensive assemblies of wave-guide elements. See the article entitled, "A Non-reflecting Branching Filter for Microwaves" by W. D. Lewis and applicant, published in the Bell System Technical Journal, vol. 27, No. 1, for January 1948, pages 83 through 95, inclusive.

A principal object of the present invention is, therefore, to simplify wave-guide structures which will function at microwave frequencies as circulators, isolators and/or branching filters.

A further object is to provide simplified wave-guide structures which are substantially equivalent electrically to much more complicated and expensive prior art wave-guide structures.

A still further object is to provide simple microwave structures having novel characteristics.

Other and further objects of the invention will become apparent during the course of the detailed description hereinunder of specific illustrative embodiments and from the appended claims.

The principles and features of the invention will be more readily understood when considered in connection with the following description and the accompanying drawings, in which:

Fig. 1 shows the conventional schematic symbol for a circulator;

Fig. 2 is a schematic representation of a specific circuit having the properties of a circulator;

Fig. 3 illustrates one embodiment of a microwave frequency circuit having the properties of a circulator and employing principally wave-guide components;

Fig. 4 illustrates one embodiment of a structurally simplified circulator and/or isolator of the invention;

Figs. 5, 6 and 7 are diagrammatic representations of energy distributions employed in explaining the operation of devices of the invention of the general type illustrated in Fig. 4;

Fig. 8 illustrates one embodiment of a microwave branching filter of the invention;

Fig. 9 illustrates an alternative way of coupling the external band pass filter to the pair of parallel channels within the main wave guide;

Fig. 10 illustrates a further form of channel branching hybrid filter of the invention;

Fig. 14 is a schematic diagram of a circuit employing a circulator of the invention;

Fig. 15 is a schematic diagram of a circuit employing three circulators of the invention; and Fig. 16 is a further modification of the structure of Fig. 12 to employ a reciprocal phase shifting element in place of the non-reciprocal element of a channel branching filter.

Figure 11:
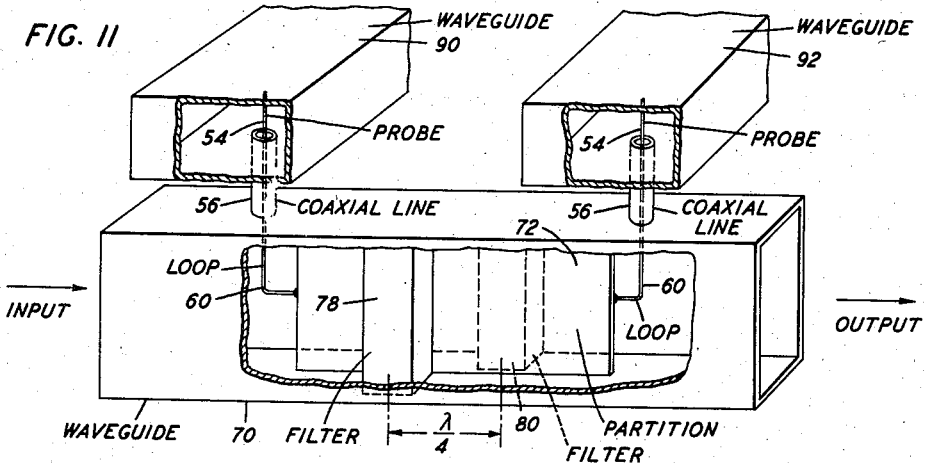
Fig. 11 shows another form of channel branching filter of the invention.

In more detail, Figs. 1 and 2 are, obviously, substantially identical with the two diagrammatic schematics shown in Fig. 14 on page 26 of the above-mentioned Bell System Technical Journal article by Hogan and have in general the same significance. However, Fig. 2 is more general than its counterpart in Fig. 14 of the article, in in that hybrid junctions 10 and 12 are represented by a more general schematic symbol to indicate that any of numerous forms of the hybrid junction will serve rather than only the so-called "magic T" hybrid junction illustrated in the Technical Journal figure.

Fig. 1, as previously stated, is the conventional symbol for a circulator and has the properties described for it in the Hogan article, namely, power from terminal 1 will be freely transmitted only to terminal 2, power from 2 to 3 only, etc., around the circulator in the direction indicated by the arrow.

Fig. 2 is a schematic diagram of one form of circuit which will provide circulator characteristics. The hybrid junctions 10 and 12 and the gyrator, or non-reciprocal phase shifter, 14, will in the present application take mechanical forms somewhat different, though substantially equivalent electrically, with respect to the specific corresponding elements indicated in the Hogan article.

In Fig. 3, by way of further illustration, we have two identical wave-guide hybrid junctions 20 and 22 of the type described and claimed in United States Patent 2,575,804, granted November 20, 1951, to H. T. Friis, W. D. Lewis and applicant jointly. (See also Fig. 6 at page 90 of the article, by W. D. Lewis and applicant, entitled "A Non-reflecting Branching Filter for Microwaves" mentioned above.) Sections of non-square rectangular wave guide 26 and 28 are identical except that section 28 includes a slug or piece of ferrite 30 asymmetrically positioned therein with respect to the larger transverse dimension of the wave guide. Since in Fig. 3, the smaller transverse dimension of the wave-guide components is shown, the ferrite member 30 is shown as extending completely across this dimension. Its dimension normal to the plane of the paper is, however, usually only a fraction of the larger transverse dimension of wave-guide section 28, for example one-tenth thereof. For reasons described in detail above, a phase and attenuation compensator 27 is included in arm 26 to prevent unbalance which might otherwise result from the reciprocal phase shift ($\theta$) and the attenuation resulting in arm 28 from the introduction of the ferrite member or slug 30 in the latter arm. The introduction of reciprocal attenuation and phase in wave guides by asymmetrically positioned members or vanes is well understood in the art as illustrated and described, for example, in United States Patents 2,600,466, granted June 17, 1952, to A. E. Bowen and 2,639,326, granted May 19, 1953, to D. H. Ring. Sections 26 and 28 interconnect one pair of conjugately related arms of hybrid junction 20 to the corresponding arms, respectively, of hybrid junction 22, as shown.

The ferrite slug should be magnetized in a direction normal to the plane of the drawing, as described for similar ferrite members in the above-mentioned copending application of S. E. Miller or in the above-mentioned Institute of Radio Engineers article. External magnetizing means, either permanent magnets or electromagnets connected to a suitable direct current energy source, may be employed or, alternatively, the slug of ferrite itself can be permanently magnetized to the necessary field strength to afford a non-reciprocal phase shift of 180 degrees. To avoid unnecessary complication of the accompanying drawings, it will be assumed that in each instance the ferrite slug is itself magnetized to the appropriate degree. It should be expressly understood, however, that independent or separate magnetizing means can be employed, as above described, if desired, in lieu of permanently magnetizing the ferrite member.

In the operation of the arrangement of Fig. 3, electromagnetic wave energy introduced into terminal 1 of junction 20 will divide equally between the two arms connected to wave-guide sections 26 and 28, respectively, and be transmitted by these sections to the corresponding arms of junction 22. For this direction of transmission, arm 82 equipped with polarized ferrite slug or member 30 will introduce an additional phase shift of 180 degrees, as explained in the above-mentioned Miller application and Institute of Radio Engineers article, so that the two equal portions of energy will arrive at junction 22 precisely out of phase and will consequently be combined in output terminal 2 of junction 22, and can, if desired, be dissipated in the matching resistive termination 23. Alternatively, termination 23 can be considered as representing a receiver or a transmission line conveying the output of arm 2 to other apparatus for appropriate utilization.

For electromagnetic wave energy introduced into arm 4 of Fig. 3, however, equal portions will again be transmitted through wave-guide sections 26 and 28, but for this direction of transmission will arrive at junction 20 in phase and will combine in terminal 1. For this direction of transmission the ferrite slug 30 will introduce only its reciprocal phase shift $\theta$ and a small attenuation both of which will be balanced out by a corresponding phase shift and attenuation provided by compensator 27 in arm 26, as described above. Arm 3 is provided with a matching resistive termination 21 which assures balance of the hybrid 20 and absorbs any out-of-phase energy components which may be reflected back to hybrid 20 if any impedance mismatch is inadvertently introduced into the over-all structure by imperfections in said structure.

The arrangement of Fig. 3 is, therefore, that described for the circulator as illustrated by Figs. 1 and 2 described above and in the Hogan article. Since energy can be transmitted from terminal 4 to terminal 1 but not from terminal 1 to terminal 4, the circuit can also be considered as "isolating" terminal 4 from terminal 1 (but not vice versa) and the circuit can be designated an "isolator."

In Fig. 4 one embodiment of a "circulator" or an "isolator" of the invention is shown and includes a section of rectangular wave guide 40 of unequal cross-sectional dimensions, having, in a central portion thereof, a longitudinal conductive partition 42 which is parallel to and substantially equidistant from the broader sides of the wave-guide section 40. At the opposite ends of this partition 42 and in a common plane therewith are the like plane resistive members 44 and 46, respectively. Members 44 and 46 can be, for example, dielectric cards coated with resistive material such as carbon. The dielectric material should preferably have a low dielectric constant such as that of polystyrene, for example. Alternatively, carbon or other particles of resistive material embedded in a dielectric binder of low dielectric constant, can be used for resistive members 44 and 46. A slug or member of ferrite 48 is asymmetrically mounted in one of the two like parallel channels formed by insertion of partition 42, as shown. This member 48 should be appropriately polarized by one of the means suggested above for the element 30 of Fig. 3. A phase and attenuation compensator 43 is included in the upper channel, above partition 42, as shown, to compensate for the reciprocal phase shift and attenuation of ferrite member 48 in the lower channel. The resistive cards 44 and 46 are effectively power absorbing terminations for terminals 3 and 2 of the circulator and couple equally to the two like parallel channels formed by inserting member 42 but are isolated by electrical balance from the ends (terminals 1 and 4) of the section of wave guide 40. Methods of connecting terminals 2 and 3 to apparatus external to guide 40 will be illustrated and described in detail below in connection with structures embodying various principles of the invention as shown in other figures of the accompanying drawings. The principles governing the operation of the over-all structure of Fig. 4 will become apparent in connection with the discussion of Figs. 5, 6 and 7 which is given immediately below.

Fig. 5 illustrates in diagrammatic form the phenomenon taking place at the right end of partition 42 of guide 40 of Fig. 4 when energy is introduced into the left end (terminal 1) of wave guide 40. The arrows represent the directions of the electric vectors for the two portions of the dominant or $TE_{10}$ mode wave normally employed for transmission through rectangular guides of this type. In the lower of the two parallel channels, formed by inserting partition 42, the phase has been changed by 180 degrees as explained above in connection with ferrite member 48 of Fig. 4, so that the electric vectors are in phase opposition as they approach resistive termination 46 at the right end of partition 42. If resistive termination 46 is designed to match the impedance of the two parallel channels at their right ends, the energy of both channels will be completely absorbed in the termination 46 and no energy will be reflected back to the left end of wave guide 40 or issue from the right end of wave guide 40.

Fig. 6 illustrates the effect in the structure of Fig. 4 of omitting the resistive termination 46. If the over-all device is electrically balanced; i. e., if the transmission characteristics of both of the parallel channels, except the non-reciprocal phase reversal introduced by ferrite member 48, are substantially identical; the wave energy of both channels will be completely reflected at the right end of partition 42 and will proceed back toward the left end of wave guide 40. Again there will be no wave energy emerging from the right end of wave guide 40.

Fig. 7 illustrates the operation of the over-all structure of Fig. 4 for transmission from the right end to the left end of wave guide 40. For this direction of transmission the ferrite member 48 will introduce no non-reciprocal phase change, the equal portions of the total input energy will arrive at the left end of partition 42 in phase and will again combine and the total energy (diminished only by the normal transmission losses of the wave-guide structure) will emerge from the left end of wave guide 40.

It is apparent from the above analysis and from inspection of the structures of Figs. 3 and 4 that the left end of the section of wave guide 40 corresponds to terminal 1 of the structure of Fig. 3, that the right end of wave guide 40 corresponds to terminal 4 of Fig. 3 and that terminals 2 and 3 of Fig. 3 correspond to the right and left ends of partition 42 of Fig. 4, respectively. Also, resistive terminations 44 and 46 of Fig. 4 correspond to terminations 21 and 23 of Fig. 3, respectively, and ferrite member 48 and compensator 43 of Fig. 4 correspond to ferrite member 30 and compensator 27, respectively, of Fig. 3. Furthermore the portions of wave guide 40 at and adjacent to the ends of conductive partition 42 function substantially as wave-guide hybrid junctions of the type illustrated by junctions 20 and 22, respectively, in the assembly of Fig. 3.

Clearly, therefore, the arrangement of Fig. 4 represents a very simple, readily and economically fabricated mechanical structure which is substantially equivalent electrically to the mechanically much more complex arrangement of Fig. 3. The structure of Fig. 4 is sometimes referred to as an isolator since, as described above, it will freely transmit energy from its right to its left end but will not transmit energy from its left to its right end. It should be noted, however, that this type of isolator depends upon the phase rather than the attenuation characteristics of the device. Such a device is very desirable, for example, for use in a long wave-guide transmission line connecting a microwave oscillator with an antenna, since it will prevent reflected energy resulting from an impedance mismatch at the antenna from causing "frequency pulling" of the oscillator.

In Fig. 8, a still further arrangement of the invention, of a type usually designated a "channel branching filter," is illustrated. It comprises, as for Fig. 4, a section of rectangular wave guide 40 having a conductive partition 42 assembled therein, a member of ferrite 48, suitably polarized to produce a non-reciprocal phase shift of 180 degrees in one of the two equal parallel channels formed by placing partition 42 in wave guide 40 and a compensator 43 in the other of said channels. The resistive terminations at the ends of partition 42, however, have been omitted so that, as explained in connection with Fig. 6 above, the total input energy introduced into the left end of wave guide 40 will divide equally between the two parallel channels, will be reflected at the right end of partition 42 and arrive back at the left end of partition 42 with the two equal portions of energy still out of phase. A section of wave guide 45, containing a band pass filter 50 comprising the section of wave guide 45 between the partitions 43 and 51, the partitions having irises 47 and 49 therein, respectively is coupled to the region in wave guide 40 at the left end of partition 42 by said iris 47, as shown.

By virtue of this arrangement energy of frequencies within the pass band of the above-described filter 50 will pass through the filter and along wave guide 45, thus effecting the desired branching of the channel or band of frequencies. Energy of frequencies outside the band of filter 50 will again be reflected at the left end of partition 42 and proceed again toward the right end of wave guide 40. A second passage through element 48 of ferrite will bring the energy in the lower of the two channels back into phase with the energy in the upper channel so that the two portions of energy will arrive in phase at their return to the right end of partition 42 and will combine and pass through the right end of wave guide 40 to load 41. Load 41 can be, for example, additional channel (or frequency band) branching filters, each branching off a different band of frequencies until all channels or frequency bands of a multi-band signal have been taken off, or, alternatively, it can be a long wave-guide transmission line carrying the remaining frequency bands to other apparatus or to the next station of a long distance communication system. In the event that all frequency bands employed to convey the signals of the system have already been branched off, load 41 can be a simple resistive matching impedance, the function of which is to absorb any residual "noise" energy and to thus prevent reflection of noise energy back to prior units where it might prove troublesome.

For transmission through the structure of Fig. 8 from right to left, the two equal portions of energy in the two channels formed by partition 42 will arrive in phase at the left end of partition 42 and will combine and pass out the left end of wave guide 40. Thus, it is apparent that wave guide 45 will receive signals within the frequency pass band of filter 50 which are being transmitted from left to right but will be substantially unaffected by signals of any frequency which are being transmitted through wave guide 40 from right to left.

In Fig. 9 an alternative method of coupling a band pass filter or other apparatus to the region at the end of partition 42 is illustrated. It comprises simply a short section of coaxial line 56, the lower end of the inner conductor of which is extended in a loop 60 and connected to the vane 42, as shown. The upper end of the inner conductor is extended into the cavity of band pass filter 52, as probe 54, parallel to the electric vector 58 corresponding to the normal dominant $TE_{10}$ mode wave in unit 52.

In Fig. 10 an additional structure embodying certain features of the invention is illustrated. This structure comprises a section of rectangular wave guide 70 and a plane conductive partition 72 therein, which elements can be the same as wave-guide section 40 and partition 42, respectively, of Fig. 4. In each of the two parallel channels formed by inserting partition 72 in wave guide 70, identical band rejection filters, 78 for the upper channel and 80 for the lower channel, are included intermediate the ends of their respective associated channels, said filters 78 and 80 being spaced longitudinally with respect to each other by a quarter wavelength of the median frequency of the frequency band which is reflected by them. Filters 78 and 80 can be, by way of example, of the type shown in Figs. 7 and 8 at page 91 of the article by W. D. Lewis and applicant in the Bell System Technical Journal, for January 1948, referred to hereinabove.

At the left end of partition 72 a band pass filter passing the same frequency band which is rejected by the filters 78, 80, is coupled through iris 84 to the structure in the manner described above for filter 50 and iris 47 of Fig. 8. Similarly, filter 76, which can be identical to filter 74, is coupled to the structure at the right end of partition 72 through iris 82. Alternatively either or both of the filters 74 and 76 can be omitted and replaced by a section of wave guide leading directly to a utilization circuit or to an impedance matching resistive termination. The primary function of filters 74 and 76 is to eliminate noise and unwanted frequencies outside the desired frequency band. In a carefully designed and constructed system such objectionable energy components may be negligible.

Terminations 71 and 73 at the left and right ends of wave-guide section 70 may represent either transmitting or receiving apparatus or wave-guide transmission lines leading to remote stations of the system with or without additional channel branching filters of the same type as that just described but branching different channels or bands of frequencies, or filters of other types such as that described above in connection with Fig. 8 of the accompanying drawings.

The structure of Fig. 10 has the peculiar property that for transmission from left to right, the band of frequencies reflected by filters 78, 80, will be branched off through band pass filter 74, while for transmission from right to left, this same band of frequencies will be branched off through band pass filter 76. In both directions of transmission all frequencies not included in the band reflected by filter 78, 80, will be transmitted directly through the structure of Fig. 10 from either end of section 70 to its opposite end. A number of possible uses for such a structure are at once evident. By way of example, it could be used to isolate communication facilities being carried by the branched band of frequencies in the two directions from the station at which the structure is installed, or it could be employed to permit the amplification of received signals of the branched band of frequencies only, and reinsertion of the amplified band of frequencies into the transmission line for transmission to a further station of the system, and the like.

Obviously, as suggested above, either of the filters 74 or 76 of Fig. 10 can be replaced by a resistive termination substantially matching the impedance of the connection to the over-all structure in which case the energy abstracted from the structure by said termination will be absorbed therein.

An alternative arrangement related to that of Fig. 10 is shown in Fig. 11. It differs from that of Fig. 10 in that it employs loop couplings of the type illustrated in Fig. 9 and described above, to couple wave guides 90 and 92 to the left and right ends of partition 72, as shown. Wave guides 90 and 92 can, if desired, include suitable filters to increase the discrimination against frequencies outside of the band or channel of frequencies it is desired to branch off. As for the structure of Fig. 10, either wave guide 90 or 92 may include a matching resistive termination to absorb the energy branched off. Structural elements of Fig. 11 bearing the same designation numbers as elements of previously described figures are, of course, identical with such elements, respectively.

Figure 12:
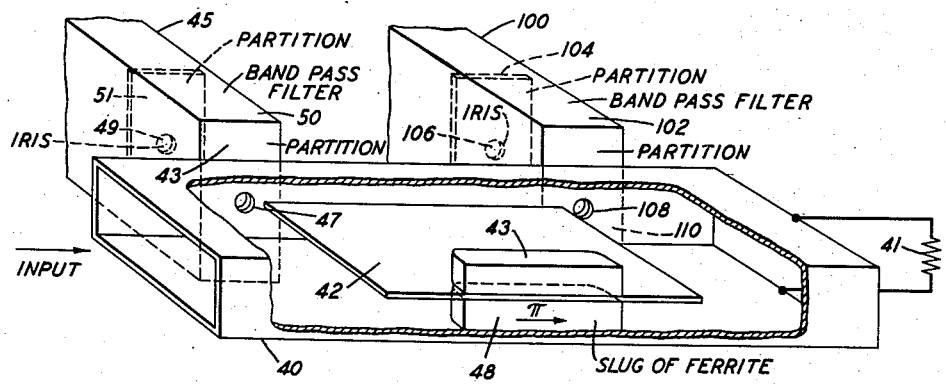
Fig. 12 illustrates a modification of the filter of Fig. 8 to branch off a second communication band or channel of frequencies.

The structure of Fig. 12 is of the general type illustrated in Fig. 8 as described in detail above. Corresponding elements of the two structures are given like designation numbers, respectively. The structure of Fig. 12 differs from that of Fig. 8 in that a second band pass filter 102 comprising partitions 104, 110, having irises 106, 108, therein, respectively, and the section of wave guide 100 included between said partitions, has been added and coupled to wave guide 40 through iris 108 at the right end and in the plane of partition 42, as shown. Filter 102 is designed to pass a different band of frequencies from that passed by filter 50, so that the over-all structure of Fig. 12 will serve to branch off two of a plurality of frequency bands or channels introduced into the wave guide 40, the operation of the over-all structure of Fig. 12 being essentially as described for that of Fig. 8, except that the additional band of frequencies is taken off the right end of partition 42 by filter 102.

Figure 13:
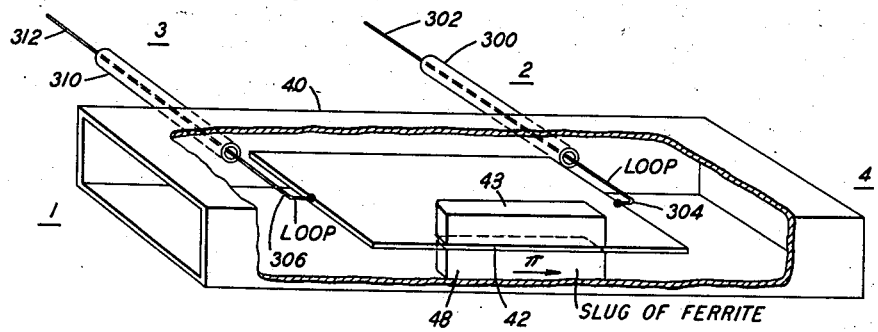
Fig. 13 illustrates another form of circulator of the invention.

In Fig. 13 a circulator of the invention is shown which, electrically, is substantially equivalent to the structure shown in Fig. 3 and described in detail above. The structure of Fig. 13 is, further, the same as that shown in Fig. 4, and described in detail above, except that the resistive termination cards 44 and 46 are omitted and replaced by coupling loops 306 and 304, respectively. Loops 306 and 304 couple coaxial line terminals 310, 312 and 300, 302 to the left and right ends, respectively, of partition 42. Similar portions of the structures of Figs. 4 and 13 are given like designation numbers and are as described above in connection with Fig. 4.

Fig. 14 is a block schematic diagram illustrating one way of employing a circulator of the invention. Circulator 200 can be, for example, of the type shown in Fig. 13 and described in detail above. A wide band of frequencies, including three predetermined bands or channels of frequency for transmitting, for example, three television channel signals, is introduced into terminal 1 of circulator 200. In accordance with the above-described circulator characteristics, the wide band of frequencies will be transmitted to terminal 2 of circulator 200 and filter 202 will pass the frequencies within a first of the three communication channels and reflect back to terminal 2 all other frequencies. The reflected frequencies will continue on to terminal 3 of circulator 200 where they will encounter filter 204 which will pass a second of the three communication channels and reflect back to terminal 3 all remaining frequencies. The last-mentioned reflected frequencies will continue on to terminal 4 of circulator 200 and there encounter filter 206 which will pass a third communication channel and reflect all the then remaining frequencies back to terminal 4. The three communication channels having been branched off, the residual energy, if any, will comprise "noise", unwanted harmonics and possibly "cross-talk" from other electrical circuits adjacent to the system. These will proceed to terminal 1 and may be eliminated, by way of example, by isolating them by means of a directional coupler to which a matching resistive impedance has been connected for the purpose of absorbing reflected energy in the transmission line connected to input terminal 1.

In Fig. 15 a similar block schematic diagram of a circuit employing three circulators 200, 208 and 218 of the invention is shown, by means of which six frequency bands or channels may be branched off through filters 210, 212, 214, 216, 220 and 222, respectively, and the residual "noise" and unwanted frequencies can be branched into an absorbing resistive matching termination 224 connected to arm 4 of circulator 218, all as shown. The operation is essentially as described for the circuit of Fig. 14 but, obviously, involves transmission of certain of the channels from one circulator to another until they reach their respective appropriate filters and output circuits.

Numerous permutations and combinations of circulators and filters of the character illustrated by the arrangements shown in Figs. 14 and 15 can obviously be readily devised by those skilled in the art and no attempt is made to describe all such combinations.

In Fig. 16 a structure similar to that of Fig. 12 except that the non-reciprocal phase shifting member 48 of Fig. 12 is replaced in Fig. 16 by a member 250 which produces a phase shift of 180 degrees for both directions of transmission, and phase and attenuation compensator 43 is replaced by an attenuation compensator 252.

Phase shifting member 250 can be, for example, a vane of a low loss dielectric material such as polystyrene as illustrated, for example, in the above-mentioned Patent 2,639,326 to D. H. Ring. Attenuation compensator 252 is proportioned and adjusted to introduce a small amount of attenuation in the upper channel to balance or compensate for the attenuation introduced by member 250 in the lower channel. It can be, for example, a relatively thin vane of a low loss dielectric material such as of polystyrene in which carbon particles have been embedded, as illustrated, for example, in the above-mentioned Patent 2,600,466 to A. E. Bowen.

Similar portions of the structures of Figs. 12 and 16 have been given corresponding designation numbers and are as described hereinabove, in connection with Fig. 12.

The structure of Fig. 16 has the following properties:

For transmission from left to right, the two equal portions of energy in the upper and lower channels will arrive at the right end of partition 42 out of phase, and the frequencies passed by filter 102 will be accepted by it and transmitted to wave guide 100. Other frequencies will be reflected back to the left end of partition 42, arriving in phase, since the energy in the lower channel has twice been changed by 180 degrees in phase, and will pass out of terminal 1. Similarly, for transmission from right to left frequencies passed by filter 50 will be accepted by it and transmitted to wave guide 45 and other frequencies will be reflected back to and pass out of terminal 4.

The above-described structures are merely illustrative of the extremely broad scope and range of the principles of the present invention and by no means exhaustively cover all applications of said principles. Numerous and varied other structures, embodying the principles of the invention will readily occur to those skilled in the art. For example, identical band pass filters can be used in place of the identical band rejection filters of Fig. 10, above (in such an arrangement, filters 74 and 76 would be changed to band rejection filters, reflecting only the frequency band passed by the new band pass filters, respectively), and one or more non-reciprocal phase shifting elements can be added to structures of the type shown in Fig. 11, which structures would then have different inter-terminal transmission paths in accordance with the principles explained in detail above for the structures of the type illustrated by Figs. 4 and 8.

What is claimed is:

1. A microwave isolator comprising an elongated section of rectangular wave guide, a plane conductive partition assembled within said section of wave guide and extending throughout a centrally located portion of said section of wave guide only, said partition dividing the channel through said central portion of said wave-guide section into two substantially identical, electrically-isolated, parallel rectangular channels, a non-reciprocal phase shifting device in one of said two channels, said device having a phase shift of 180 degrees for one direction of transmission in excess of its phase shift for the opposite direction of transmission through said wave guide and a pair of resistive plane terminating members, one of said members being located immediately adjacent each end of said partition, respectively, and in the plane of said partition, said elongated section of wave guide extending beyond the outer end of the resistive terminating member at each end of said isolator.

2. The microwave isolator of claim 1 and means in the other of said two substantially identical electrically-isolated parallel rectangular channels for compensating for the reciprocal phase shift and attenuation of the said non-reciprocal phase shifting device in said one of said channels.

References Cited in the file of this patent

UNITED STATES PATENTS

| | | |
|---|---|---|
| 2,231,602 | Southworth | Feb. 11, 1941 |
| 2,445,895 | Tyrrell | July 27, 1948 |
| 2,516,528 | Purcell | July 25, 1950 |
| 2,531,447 | Lewis | Nov. 28, 1950 |
| 2,593,120 | Dicke | Apr. 15, 1952 |
| 2,603,709 | Bowen | July 15, 1952 |
| 2,643,295 | Lippmann | June 23, 1953 |
| 2,679,631 | Korman | May 25, 1954 |
| 2,755,447 | Englemann | July 17, 1956 |
| 2,759,154 | Smith | Aug. 14, 1956 |
| 2,764,740 | Pratt | Sept. 25, 1956 |
| 2,792,551 | Smith | May 14, 1957 |

OTHER REFERENCES

Publication I, Hogan, "The Microwave Gyrator," Bell Technical Journal, vol. 31, January 1952, pp. 1–31.

Kales et al.: "A Nonreciprocal Microwave Component," Journal of Applied Physics, vol. 4, No. 6, pages 816–17.